UNITED STATES PATENT OFFICE.

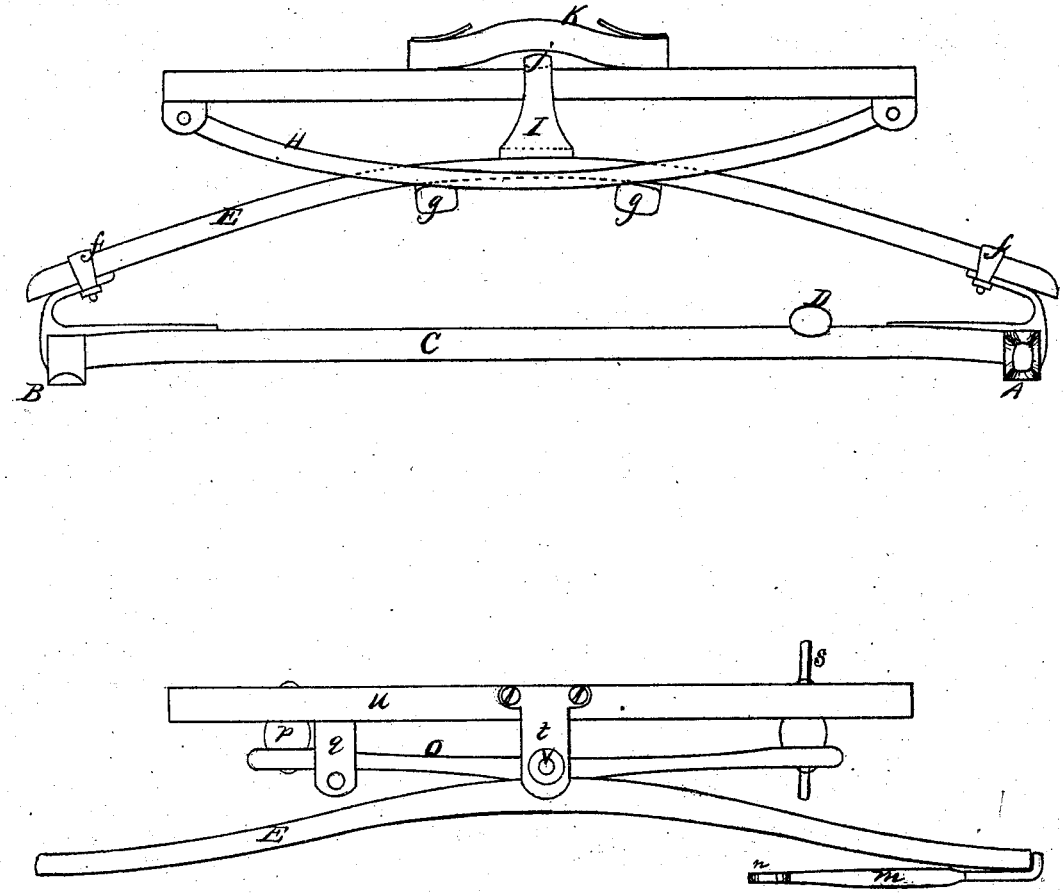

CLARK ELLIOTT, OF WOODLAND, CALIFORNIA, ASSIGNOR TO HIMSELF AND NATHAN ELLIOTT, OF SAME PLACE.

IMPROVEMENT IN VEHICLES.

Specification forming part of Letters Patent No. 116,284, dated June 27, 1871.

*To all whom it may concern:*

Be it known that I, CLARK ELLIOTT, of Woodland, county of Yolo, State of California, have invented an Improved Wagon; and I do hereby declare the following description and accompanying drawing are sufficient to enable any person skilled in the art or science to which it most nearly appertains to make and use my said invention or improvements without further invention or experiment.

My invention relates to improvements in buggies, carriages, and light wagons; and it consists in a peculiar manner of mounting the bed or body upon the carriage-frame so as to give it an easy and undulating motion at the same time that it is rendered strong and substantial.

In order to more fully illustrate and explain my invention, reference is had to the accompanying drawing forming a part of this specification, in which—

A represents the bolster, and B the rear axle-bed of any carriage or light wagon, and C C are the reaches which connect them. Near the forward end of the carriage these reaches are joined together by a cross-bar, D, so as to strengthen them and permit of the step being secured to one or both of them near this point. E E are curved braces, the opposite ends of which are fixed to the ends of the reaches by a clip, $f$, so as to keep them firmly in place. These braces are connected by two cross-bars, $g$, upon which the upward curving center spring H is supported. Secured to the highest part of the curved braces E is a metal standard, I, the upper end of which is bent outward at right angles, as shown, so as to form a horizontal end plate, $j$. This standard passes up through the bottom of the carriage-bed or body, and the end plate $j$ is inserted beneath a strip or block of India rubber, K, which has its opposite ends fixed to the bottom of the bed, thus allowing the body to spring up and down, the block or strip of rubber serving as the spring. This rubber spring can be covered by suitable housing to protect it from being injured or displaced. The center upward-curved spring H serves as a rocker to allow of an easy undulating or back-and-forth rocking motion to the bed, while the plates $j$ serve as journals upon which the bed can rock. Figure 2 represents another method of mounting the bed upon the curved braces E, which is more particularly applicable to light express and job wagons. In this device the ends of the braces E are fitted in a plate, $m$, the end of which is turned up so as to cover the end of the brace and provide a firm seat for it. The extension of this plate $m$ forms a brace, $n$, which is secured to the reaches C. Instead of the vertical standard I, a horizontal bar, O, is bolted to the brace E, and the bed or body rests above this upon elastic blocks $p$, which are placed between the two, guiding-plates $q$ or pins $s$ being used to prevent any side motion. A plate, $t$, the lower end of which is slotted, is bolted to the bed-piece $u$, and extends down beside the horizontal bar O. A screw, V, passes through the slot so as to allow the plate to work up and down with the bed. By this means I am able to construct an easy-moving carriage or wagon which shall be strong, substantial, and cheap.

Having thus described my invention, what I claim, and desire to secure by Letters Patent, is—

1. The curved brace E, in combination with the vertical standard I having the horizontal plate $j$ and India-rubber spring K attached, as described, for the purpose specified.

2. In combination with the curved brace E, the horizontal bar O, Fig. 2, and bed-piece $u$, together with the interposed rubber blocks $p$, guiding-plates $q$ or pins $s$, and the steadying slotted plate $t$, all combined and arranged substantially as and for the purpose above described.

In witness that the above-described invention is claimed by me I have hereunto set my hand and seal.

CLARK ELLIOTT. [L. S.]

Witnesses:
D. W. BURNS,
H. B. WOOD.